United States Patent
Atwood et al.

(10) Patent No.: US 11,934,496 B2
(45) Date of Patent: Mar. 19, 2024

(54) METHOD AND SYSTEM FOR AUTHENTIC NON-FUNGIBLE TOKEN (NFT) PRINTING

(71) Applicant: Xerox Corporation, Norwalk, CT (US)

(72) Inventors: Christopher Douglas Atwood, Rochester, NY (US); Frank B. Tamarez Gomez, Baldwinsville, NY (US); Jacob McCarthy, Williamson, NY (US); Joseph M. Ferrara, Jr., Webster, NY (US); Joseph Fredrick Casey, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 233 days.

(21) Appl. No.: 17/651,931

(22) Filed: Feb. 22, 2022

(65) Prior Publication Data
US 2023/0267183 A1     Aug. 24, 2023

(51) Int. Cl.
| | |
|---|---|
| *G06F 3/12* | (2006.01) |
| *B29C 64/386* | (2017.01) |
| *B33Y 30/00* | (2015.01) |
| *B33Y 50/00* | (2015.01) |
| *G06F 21/16* | (2013.01) |

(Continued)

(52) U.S. Cl.
CPC ............ *G06F 21/16* (2013.01); *B29C 64/386* (2017.08); *B33Y 30/00* (2014.12); *B33Y 50/00* (2014.12); *G06F 3/1222* (2013.01); *G06F 3/1238* (2013.01); *G06F 3/1253* (2013.01); *G06F 3/126* (2013.01); *G06F 3/1285* (2013.01); *G06F 21/608* (2013.01); *B42D 25/30* (2014.10)

(58) Field of Classification Search
None
See application file for complete search history.

(56) References Cited

U.S. PATENT DOCUMENTS

| | | |
|---|---|---|
| 9,137,405 B2 | 9/2015 | Eschbach et al. |
| 9,282,215 B2 | 3/2016 | Chapman et al. |
| | (Continued) | |

FOREIGN PATENT DOCUMENTS

| | | |
|---|---|---|
| WO | 2018165155 A1 | 9/2018 |
| WO | 2019/141297 | 7/2019 |

OTHER PUBLICATIONS

Prints authenticated by James Moritz, Sep. 17, 2021, as published at https://jamesmoritz.com/prints.

(Continued)

*Primary Examiner* — Haris Sabah
(74) *Attorney, Agent, or Firm* — Fox Rothschild LLP

(57) ABSTRACT

Methods and systems for generating a secure copy of content associated with a non-fungible token (NFT) are disclosed. The system will receive a print request to print digital content that is associated with an NFT, access a blockchain to identify a current owner of the NFT, and generate a print job that with instructions to print the NFT content. If and only if the current owner of the NFT is the requesting entity, the system will print a unique authentication code with the digital content. The system will cause a print engine to print the digital content on a substrate or as a 3D object. In some embodiments, the system may be included in a print device that includes the print engine. Other aspects include a system that verifies whether a printed copy of content is an authorized copy, using the unique authentication code and the NFT described above.

25 Claims, 4 Drawing Sheets

(51) Int. Cl.
   *G06F 21/60*         (2013.01)
   *B42D 25/30*         (2014.01)

(56)         References Cited

U.S. PATENT DOCUMENTS

| | | |
|---|---|---|
| 9,679,276 B1 | 6/2017 | Cuende |
| 9,919,477 B2 | 3/2018 | Levine et al. |
| 9,960,920 B2 | 5/2018 | Cuende et al. |
| 9,961,230 B2 | 5/2018 | Eschbach et al. |
| 10,129,032 B2 | 11/2018 | Vandervort |
| 10,164,952 B2 | 12/2018 | Vandervort |
| 10,237,442 B2 | 3/2019 | Chapman et al. |
| 10,270,600 B2 | 4/2019 | Vandervort |
| 10,425,554 B1 | 9/2019 | Chapman |
| 10,452,964 B1 | 10/2019 | Chapman et al. |
| 10,462,326 B2 | 10/2019 | Chapman |
| 10,812,675 B1 | 10/2020 | Chapman |
| 10,926,471 B2 | 2/2021 | Levine et al. |
| 10,960,698 B2 | 3/2021 | Beabes et al. |
| 11,170,092 B1 | 11/2021 | Liang |
| 11,481,826 B1 * | 10/2022 | Karpas ............... B41F 16/0093 |
| 2012/0140287 A1 * | 6/2012 | Kawaguchi ........ G06K 15/1817 358/1.16 |
| 2017/0237570 A1 | 8/2017 | Vandervort |
| 2017/0279783 A1 | 9/2017 | Milazzo et al. |
| 2017/0329996 A1 | 11/2017 | Wilson |
| 2020/0092106 A1 | 3/2020 | Leong |
| 2021/0132888 A1 | 5/2021 | Yuki et al. |
| 2021/0208822 A1 | 7/2021 | Veenma |
| 2021/0256110 A1 * | 8/2021 | Guinard ................. G06Q 10/08 |
| 2022/0222364 A1 | 7/2022 | Roberts et al. |
| 2022/0294642 A1 | 9/2022 | Moriya et al. |
| 2022/0309491 A1 | 9/2022 | Shapiro et al. |
| 2023/0130182 A1 * | 4/2023 | Mir ....................... H04L 9/3297 713/189 |
| 2023/0353717 A1 * | 11/2023 | Ito ........................ H04N 13/117 |

OTHER PUBLICATIONS

How NFTs are Tracked and Verified, Cyber Scrilla, Feb. 14, 2022, available at https://cyberscrilla.com/how-nfts-are-tracked-and-verified/.

C. Lakmal, S. Dangalla, C. Herath, C. Wickramarathna, G. Dias and S. Fernando, "IDStack—The common protocol for document verification built on digital signatures," 2017 National Information Technology Conference (NITC), 2017, pp. 96-99, doi: 10.1109/NITC.2017.8285654.

Holland and Stjepandic, "Intellectual Property Protection of 3D Print Supply Chain with Blockchain Technology," 2018 IEEE International Conference on Engineering, Technology and Innovation (ICE/ITMC), pp. 1-8 (2018).

Disclosed Anonymously, "Concept for the secure transfer and limitation of 3D print files based on a permissioned blockchain," An IP.com Prior Art Database Technical Disclosure, IP.com No. IPCOM000251141D, Electronic Publication Date: Oct. 17, 2017 (9 pages).

* cited by examiner

METHOD AND SYSTEM FOR AUTHENTIC NON-FUNGIBLE TOKEN (NFT) PRINTING

BACKGROUND

A non-fungible token (NFT) is a unique set of data stored on a distributed digital ledger. NFTs can hold any form of digital content, such as drawings, animations, videos, photographs and other digital artworks, as well as text, music, videos, documents such as event admission tickets, and other works of authorship. Because an NFT is unique and non-fungible, an NFT allows a creator of digital content to designate one—and only one—copy of the work to be the "original". By storing each NFT on a distributed digital ledger (i.e., a blockchain) along with an identification of the NFT's owner, ownership of each NFT is a verifiable, public record.

Currently, unless the file includes technical countermeasures that prevent printing and copying, anyone can print a copy of a digital content file. However, such countermeasures are not desirable in the field of NFT art, as they would prevent even a purchaser of the NFT from printing the work to view and display. Thus, NFT files typically do not have the digital rights management countermeasures that are used to prevent copying of files that are off the blockchain.

Ownership of physical artwork is easy to verify, as the owner has possession of the physical work. However, there is currently no easy way to verify whether someone who possesses a printed copy of a work of art is the owner of the work's NFT, as there is no difference between a copy printed from the NFT file and a copy printed from another digital file that is not associated with the NFT.

This document describes methods and systems that are directed to solving the issues described above.

SUMMARY

In various aspects, this disclosure describes a method, a system configured to execute the method, and a computer program product configured to cause a processor to implement a method of generating a secure printed copy of content associated with an NFT. The system includes a processor and a computer-readable medium containing programming instructions that are configured to instruct the processor to implement the method. The method includes receiving a print request from a requesting entity, wherein the print request comprises a request to print digital content that is associated with an NFT on a substrate or as a three-dimensional (3D) object. The method also includes accessing a distributed digital ledger that is associated with the NFT to identify a current owner of the NFT. The method includes generating a print job that comprises a set of instructions to print the digital content that is associated with the NFT. If the current owner of the NFT is the requesting entity, the set of instructions will include directions to print a unique authentication code with the digital content; otherwise, the set of instructions will not include commands to print the unique authentication code. The method will then include transferring the print job to a print engine of a print device to print the digital content.

Optionally, the method also may include transmitting the unique authentication code and an identifier for the NFT or for the digital content to the distributed digital ledger for storage in a block.

In any of the embodiments above, when transmitting the unique authentication code and the identifier to the distributed digital ledger, the method may be limited to doing so only after the print device has printed the digital content.

In various embodiments, the print device may print the unique identification code with the digital content. If the print device is a two-dimensional printer, it may print both the code and the digital content on a substrate. Alternatively, if the print device is a three-dimensional print device, the print job may include instructions to print the digital content as a three-dimensional object, and to either print the verification code on a surface of the three-dimensional object or embed the verification code within the three-dimensional object.

In any of the embodiments above, when printing the unique identification code, the system may print a machine identification code that includes a serial number for the print device and a time at which the print device printed the digital content.

In any of the embodiments above, after the digital content is printed, the method also may include: receiving an image of the printed content, along with a credential associated with an entity who provided the image; processing the image to extract the unique authentication code from the image; and accessing the distributed digital ledger to (a) identify the NFT that is associated with the unique authentication code, and (b) identify the current owner of the NFT, The method may then include outputting an indication that the printed content is an authenticated copy only if the current owner of the NFT matches the entity associated with the credential; otherwise the system will not output an indication that the printed content is an authenticated copy.

In any of the embodiments above, after the digital content is printed on the substrate, the system may: receive an image of the printed content; process the image to extract the unique authentication code and printed content from the image; access the distributed digital ledger to identify the NFT that is associated with the unique authentication code and content of the NFT that is associated with the unique identification code; and compare the content of the digital image to the content of the NFT. The system may then output an indication that the printed content is an authenticated copy only if (a) the authentication code from the image matches an authentication code associated with the NFT in the distributed digital ledger, and (b) the printed content matches the content of the NFT that is associated with the unique identification code; otherwise, the system may not output an indication that the printed content is an authenticated copy. Also optionally, in these embodiments, after the digital content is printed, the system may: receive a credential associated with an entity who provided the image; access the distributed digital ledger to identify the current owner of the NFT that is associated with the unique authentication code; and output the indication that the printed content is an authenticated copy only if the current owner of the NFT matches the entity associated with the credential. Otherwise, the system will not output the indication that the printed content is an authenticated copy.

In any of the embodiments above, the system also may include the print device. The processor and the computer-readable medium may be components of the print device, or they may be components of a computing device that is in communication with the print device.

In any of the embodiments above, to generate the print job the system may extract some or all data of the digital content from the NFT and use the extracted data to generate a print system object that represents the digital content and that includes instructions for rendering the digital content on the print device.

In any of the embodiments above, to generate the print job the system may: (a) extract an address for a server from the NFT; (b) query the server for the digital content; and (c) upon receipt of the digital content from the server, generate a print system object that represents the digital content and that includes instructions for rendering the digital content on the print device.

In any of the embodiments above, in response to the NFT containing a rule requiring payment of a royalty or fee for printing an authenticated copy of the digital content, the system may wait to transfer the print job to a print device until the system has received confirmation of payment of the royalty or fee.

In any of the embodiments above, to print the unique authentication code the system may encode a unique combination of characters into a pattern of microdots on the substrate, or into a pantograph mark, a correlation mark, a watermark, a barcode, a QR code, or a matrix code.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

Additional terms that are relevant to this disclosure will be defined at the end of this Detailed Description section.

As described above, a non-fungible token (NFT) is a unique set of data stored in a distributed digital ledger. The data included in an NFT can be any work of authorship, including but not limited to digital artwork such as graphic art, a photograph, a three-dimensional (3D) model, a GIF or a video, in-game items and other digital assets purchased for use in a videogame or other virtual platform, or unique documents such as event admission tickets, deeds and other legal documents. Each NFT is stored on a public, distributed digital ledger (i.e., a blockchain) and includes an identification of the NFT's owner. At the time of this writing most NFTs are part of the Ethereum blockchain, but this disclosure is not limited to that particular platform.

Figure 1:
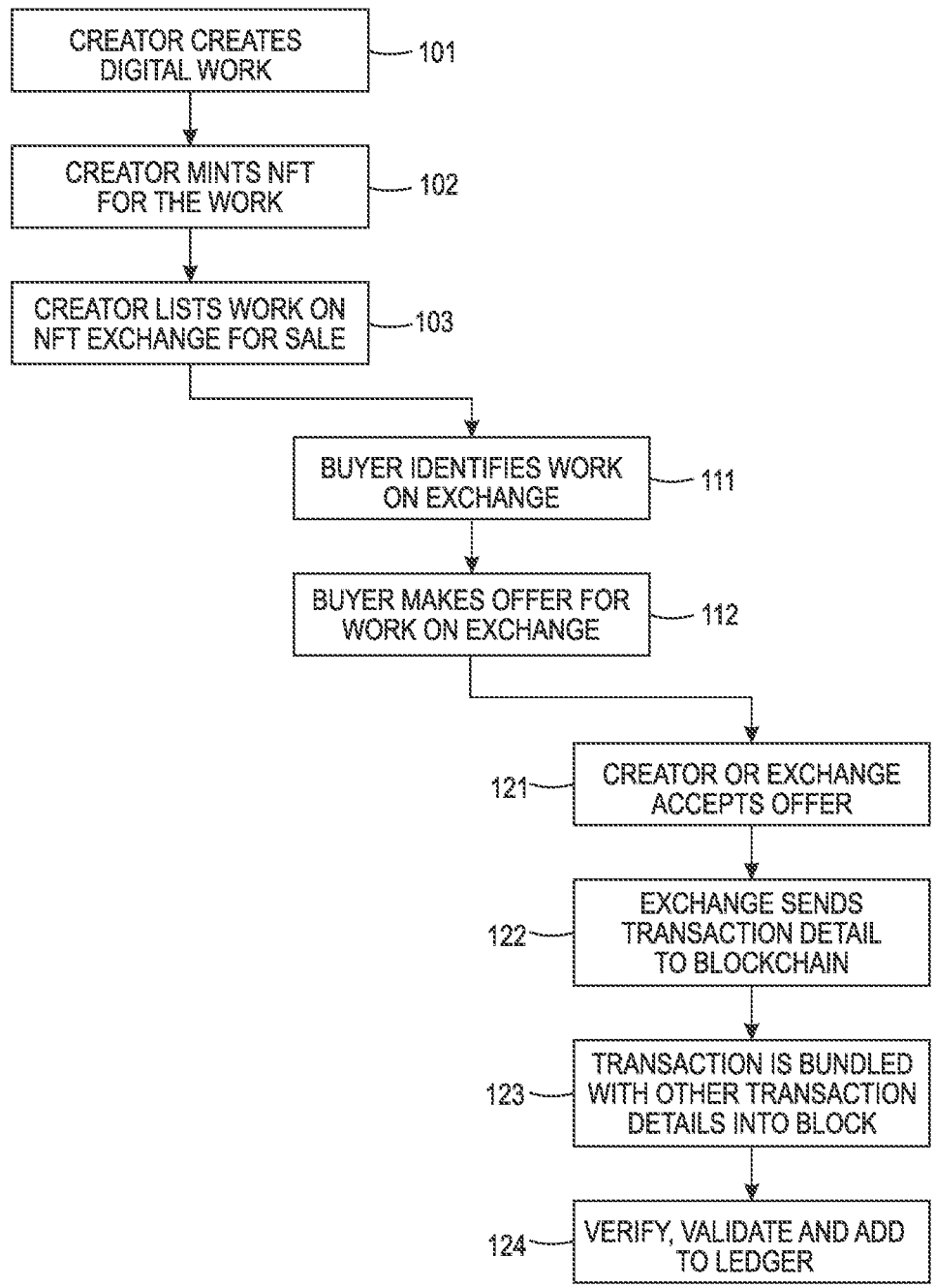
FIG. 1 illustrates a process of creating and transferring ownership of a non-fungible token (NFT) as is known in the prior art.

FIG. 1 illustrates a process of creating and transferring ownership of an NFT as is known in the prior art. At 101 an artist, photographer, writer, or other creator creates a digital work such as artwork; a collection of photos or drawings; a book, article or poem; a work of authorship; or another document or object as described above. The digital work will be stored in one or more digital files that a computer application such as a word processor, a photo or publishing application, a browser or another application may access and process for display, printing or other use on a computing device.

At 102 the creator mints an NFT for the work for use with a blockchain platform such as the Ethereum, EOS, Solana, or Binance Smart Chain platforms. To mint an NFT, the creator must first create a digital wallet (or designate an existing digital wallet) that is compatible with the blockchain platform's token standard for NFTs. The creator must also have a user account on an NFT exchange, which is an online marketplace where buyers and sellers can exchange digital items, or another NFT minting service. Commonly-used NFT exchanges at the time of this writing include those known as OpenSea, Rarible, Mintable and MakersPlace. NFT minting services that do not necessarily also operate online marketplaces include that known as CXIP. This document may generally refer to NFT exchanges and other NFT minting services as "NFT platforms". The NFT platform's user interface will include a workflow that the creator (or a representative of the creator) must follow to mint an NFT for a work. For example, the workflow may require the creator to upload the digital content file (or files) for the work to the marketplace. Alternatively, the workflow may permit the creator to designate an address of a server at which the digital content is hosted. The exchange also may require the creator to associate a name and/or description with the content, and the workflow may offer the user the opportunity to associate one or more traits or attributes with the file (such as a password or other alphanumeric trait, and/or unlockable content that can only be viewed by the purchaser). Once the information submission process complete, the exchange will require the creator to sign a message in their digital wallet. When the digital signature is provided, the NFT is created and is associated with the creator's digital wallet, because the creator is the owner of the NFT at the time of the NFT's creation. The NFT platform may write the NFT to the blockchain at this time; alternatively, the NFT platform may hold the NFT and write it to the blockchain with a transaction record after the NFT is sold, which will be described in more detail below.

Once the NFT is created, at 103 the creator may list the NFT for sale on a marketplace by identifying terms of sale such as an auction sale with minimum bid, a fixed price, or other terms such as a requirement that the creator receive a royalty upon any resale of the NFT to another entity in the future.

After the NFT is listed on the online marketplace, at 111 a buyer can view the NFT's associated work on the exchange, and at 112 the buyer may submit to the exchange an offer to purchase the NFT. At 121 the exchange and/or the creator examines the offer and determines whether to accept the offer. For example, if the terms provide for terms of sale such a fixed price, and if the buyer's offer is the first offer to satisfy the terms, then the exchange or the creator may accept the buyer's offer at 121. However, if the terms include an auction, the exchange and/or the creator may examine all offers received during a period of time of the auction and select, from all offers that satisfy the terms of sale, the offer that includes the highest bid.

Upon acceptance of the offer, the exchange will require the buyer to sign a message in the buyer's digital wallet. The exchange transfers ownership of the NFT to the buyer by removing the NFT's association with the creator's digital wallet, associating with the NFT a link to the public key of the buyer's digital wallet, and sending a record of the transaction to the applicable blockchain platform at 122. If the NFT was not yet written to the blockchain platform, the exchange also may write the NFT to the blockchain platform at this time as part of step 122.

At 123 the blockchain platform will bundle the transaction record with one or more other records into a block. When grouping the transaction record into a block, the system may choose a group of records having a total size that is within a target size range. The platform may apply any other set of rules to determine which records to group into a block, such as rules that prioritize certain types of records over others, or rules that will group records having one or more common attributes.

At 124 the blockchain platform will verify the transaction and/or validate the block and, upon verification and verification, add the block to the platform's permanent distributed digital ledger. To validate a transaction (which is a process that the system may do before or after adding the transaction to a block), the system also may check the transaction against various rules. The rules can be kept on centralized servers, while in more distributed systems all nodes that store any part of the blockchain would have a copy of all rules. For example, the rules may require that the system review the existing blockchain and confirm that the seller is the current owner of the NFT. To validate a block, the system may create a proof of work for the block using any of various methods, such as by adding a nonce (a random number) to the block data, then hashing the block data. If the hash fails to meet the requirements of the proof of work, the nonce is changed and a new hash is made. When the system has successfully created a proof of work for a valid block, it sends the solution (the proof of work) to all nodes of the system.

Figure 2:
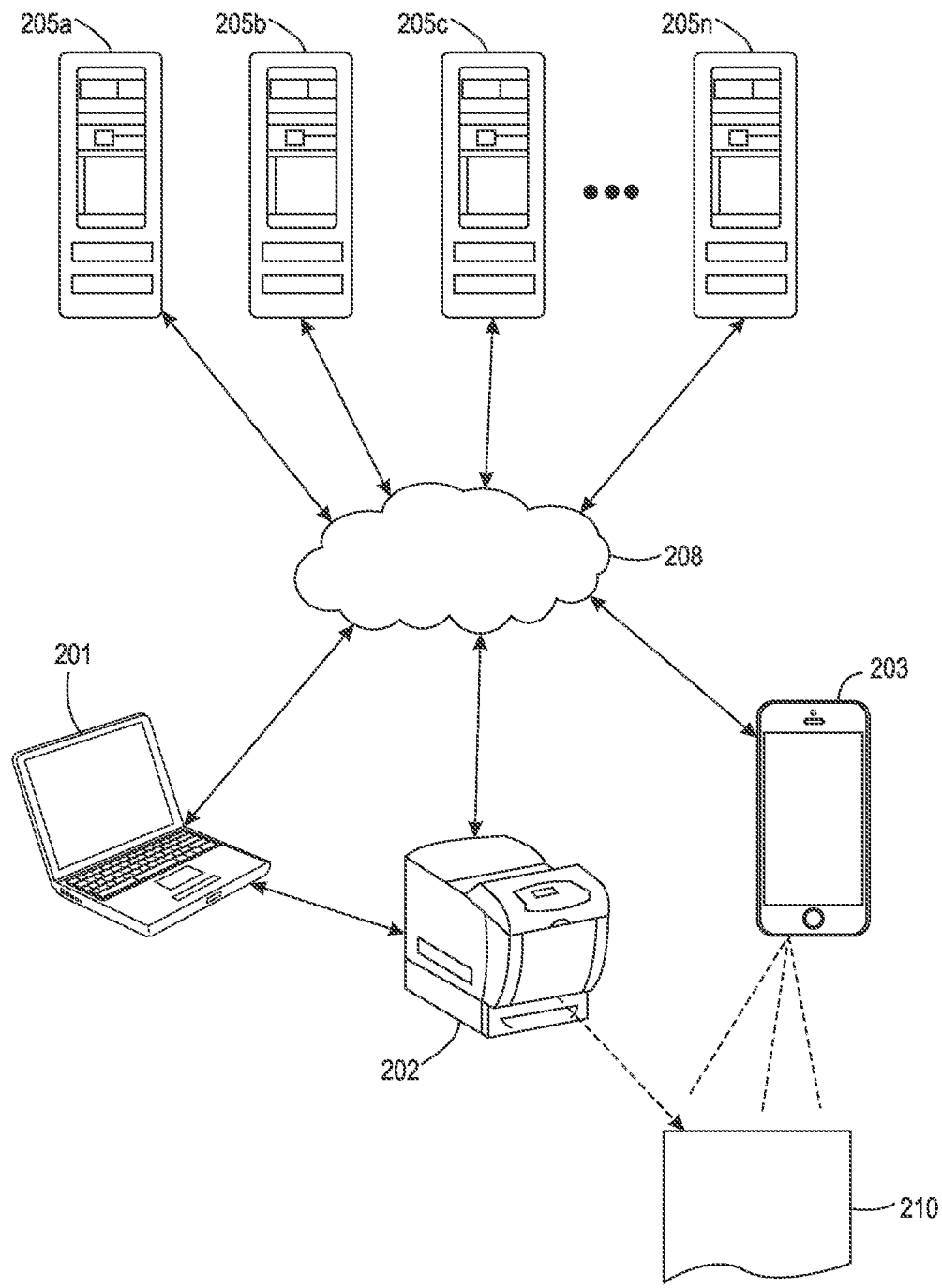
FIG. 2 illustrates a system that may be used to print an authenticated copy of digital content that is associated with an NFT.

FIG. 2 illustrates a system that may be used to print an authenticated copy of digital content that is associated with an NFT. After an entity has created or acquired NFT art or an NFT for other digital content, that entity may use a system that includes a computing device 201 and a print device 202 to print an authenticated copy of the content. The computing device 201 may be integrated within the print device 202, or the devices may be separate devices that are able to transfer messages and communicate with each other via a direct communication link (such one using Bluetooth or another near-field or short-range communication protocol) or via an indirect link through one or more other devices and/or communication networks 208 such as a Wi-Fi network, local area network, cellular communication network and/or the Internet. The computing device 201, print device 202 or both may be devices located in a home of the user, in an office environment, or in a print kiosk arrangement such as may be found in a retail store, hotel, airport or other public location.

The print device 202 will then execute a print job to print the digital content as a tangible printed object 210. For example, if the print device is configured to print two-dimensional (2D) images on a substrate, the object may be a document of any number of pages, a photograph or set of photographs, or a finished object such as a book or pamphlet, or a substrate that is a surface of a three-dimensional (3D) object if the print device is a direct-to-object printer. If the print device 202 is a 3D printer, it will print the printed object 210 as multiple layers of build material that the device extrudes onto a print bed. After the print device 202 has printed the digital content to yield a printed object 210, a second computing device 203 containing a camera may be used to verify that the document was printed by the owner of the NFT using a process described below. When printing unique identification codes such as authentication codes (as will be described below), a 2D printer may print the code on either side of the substrate or object surface. A 3D printer may print the code on the surface of the object, or it may embed the code within the object using embedded data printing processes such as those described in U.S. Pat. Nos. 9,919,477 and 10,926,471, each of which are issued to Levine et al.

The system will include any number of servers 205a . . . 205n that collectively store a distributed digital ledger, such as the Ethereum blockchain. Each server 205a . . . 205n will be a node that stores all or a portion of the blockchain, and the blockchain's elements will be replicated to each of the nodes. Each server may be any electronic device containing a computer-readable memory on which data may be stored, along with a communication device that can transmit data to and receive data from other devices. The first computing device 201, the second computing device 203, and/or the print device 202 may communicate with the servers 205a . . . 205n of the blockchain platform via one or more communication networks 208. Optionally, either or both of the computing devices 201, 203 and/or the print device 202 may serve as nodes of the blockchain platform.

Figure 3:
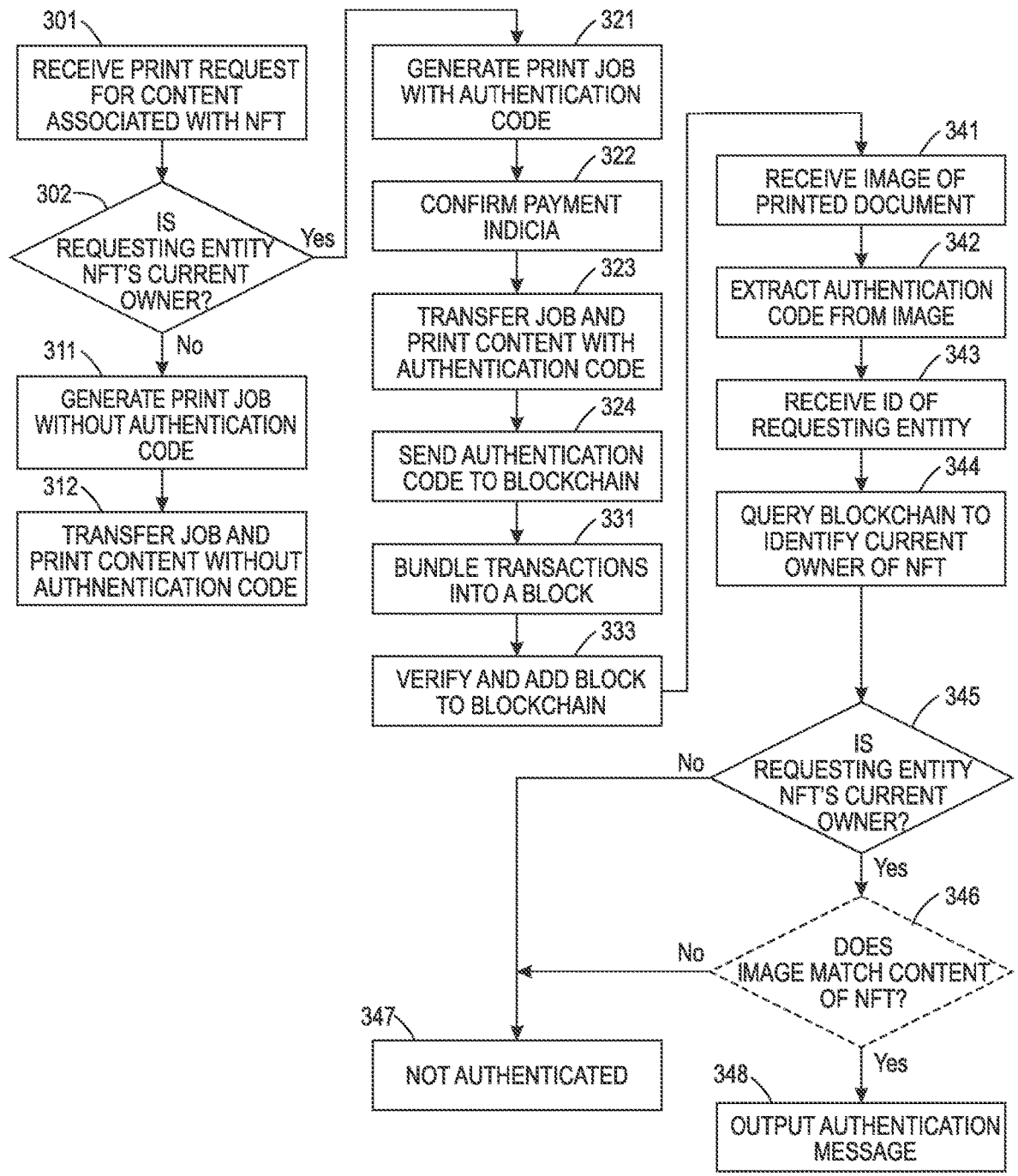
FIG. 3 illustrates a process for printing an authenticated copy of an NFT work, creating a record of the print, and then authenticating the printed copy.

FIG. 3 illustrates a process by which a system such as that shown in FIG. 2 may generate and print an authenticated copy of content associated with an NFT. FIG. 3 also illustrates how the system may verify that the printed copy is held by the owner of the NFT. At 301 the computing device will receive a print request from a requesting entity. The print request will include a request to print digital content that is associated with an NFT on a substrate. The print request will include an identifier for the NFT, as well as an identifier for the requesting entity. The identifier of the requesting entity may be part of the request, or the application may require the user to submit an authentication credential. Alternatively, the application may cause the device to separately identify the requesting entity, such as by accessing an identifier for a user who has logged into the device. Referring again to FIG. 2, the computing device may be a print device 202 or a separate computing device 201 that is in communication with the print device 202. Either way, the receiving device will run an application (either from its memory, or from a server via a browser or other thin client application) that performs the NFT verification and printing steps described below.

Returning to FIG. 3, at 302 the computing device will check the blockchain to verify whether the entity who requested the print job is the current owner of the NFT. The system may use any now or to be known blockchain authentication process to do this. For example, the system may use authentication frameworks such as: Instant Karma Pubic Key Encryption (PKI), as proposed by Matsumoto and Reischuk in 2017; privacy-aware blockchain-based PKI (PB-PKI), as proposed by Axon and Goldsmith in 2017; Primechain-API, as proposed by Nagpal in 2018, or other authentication frameworks.

The system will then generate a print job that includes a set of instructions to print the digital content that is associated with the NFT on a substrate. If the system cannot confirm that the requesting entity is current owner of the NFT (302: NO), then at 311 the system will generate the print job without any commands to print the unique authentication code on the substrate. At 312 the computer will transfer the print job to the print device 202, which may then execute the print job and print the content without the code.

However, if (and only if) the current owner of the NFT is the requesting entity (302: YES), then the system will generate the print job at 321 with directions to print a unique authentication code with the digital content on the substrate. To generate the unique authentication code, the system may use any suitable code generation process. For example, the system may generate a machine identification code (MIC), which is a digital watermark that encodes a unique combination of characters (such as a number and/or letter combination) into a pattern that is inconspicuous in that it is not discernable by the unaided human eye, such as a pattern of tiny dots (generally known as microdots) spread over some or all of the print area. Methods of generating a MIC include those developed by Xerox Corporation and are known in the art. The MIC will contain a serial number of the print device, along with a date and time at which the document is printed. With this combination of information, each MIC will be unique, as only one document can be printed by a printer at any given time. Other inconspicuous codes, such as pantograph marks, correlation marks, other types of watermarks, or more visible marks such as barcodes, QR codes and matrix codes, may be employed in various embodiments. Further, other pieces of information or combinations of information could be encoded into the code, including the date and time of the user's printing request, an identification number of each print or print job, the creator of the NFT, the current owner of the NFT, or the entity operating the NFT printing system.

To generate the elements of the print job that include instructions for the print device to print the digital content, if the NFT contains the content data the system may extract that data from the NFT and use the data to generate a queueable print system object that represents the digital content and that includes instructions for using the print device to render the digital content on a substrate. If the NFT does not include the content data but instead includes the address of a server or an identifier for a blockchain where the content is stored, the system may extract the address or identifier from the NFT, query the server or blockchain for the digital content and, upon receipt of the digital content from the server or blockchain, generate a queueable print system object that represents the digital content and that includes instructions that the print device may use to render the digital content on the substrate.

Optionally, before or after generating the print job, at 322 the system may require the requesting entity to remit indicia of payment for the print job before it will transfer and/or execute the print job. For example, if the print device is part of a commercial print kiosk, a print shop, or another system that requires a user to pay a fee to print a document, the system may require the requesting entity to provide credit card account information, debit card account information, other payment account information, or payment confirmation from a digital wallet before the system will permit the print device to print the document. In addition, if the NFT includes rules that require payment of a royalty to the content creator, their agent, or another entity such as a publisher for printing authenticated copies, the system may require the user to provide a payment confirmation (such as those described above) before it will allow the user to print a copy that contains the identification code.

After the computing device generates the print job at 321 with directions to print the unique authentication code, and optionally only after confirmation of payment at 322, at 323 the computing device will transfer the print job to the print device 202, which may then execute the print job and print the content and the code on a substrate. In addition, at 324 the computing device will transmit the unique authentication code and an identifier for the NFT or for the digital content to the blockchain for storage in a block. For example, at 331 the blockchain platform may bundle the transaction record with one or more other records into a block using processes and rules such as those described above in the discussion of FIG. 1. At 333 the blockchain platform will verify the transaction and/or validate the block and, upon verification and verification, add the block to the platform's permanent distributed digital ledger. Example methods of validation are also described above. In some embodiments, the computing device may transmit the authentication code and the identifier to the blockchain before the print device prints the content; in other embodiments (such as in embodiments that use a MIC code), the computing device may do so only after the print device has printed the digital content.

After the digital content is printed on the substrate, at 341 a computing device 203 having a camera and/or scanner may capture a digital image of the substrate. That device, or another device, will receive the digital image (at 341) and a secure credential for an entity who provided the image (at 343). The secure credential may be a private key, a passcode, a biometric identifier, an address of a known trusted sender or any other indicia that enables the system to identify or verify the entity who provided the image. The secure credential may be received with the digital image, or it may be received earlier in the process, such as at any time during a session in which the entity was verified at the beginning of the session. The digital image and the secure credential may be received at the same time or in separate steps. For example, the entity who is logged into an electronic device using the secure credential may use a camera, scanner or other imaging device of the electronic device to capture the digital image. Alternatively, the entity may provide the secure credential before or after uploading the digital image from a separate source.

At 342 the processor of the device will process the image to extract the unique authentication code from the image using any suitable image processing method. For example, if the image includes a MIC code, the system may identify the dot pattern in the matrix and decode the dot pattern to yield the code using known MIC decoding processes.

At 344 the system will access the distributed digital ledger to identify the NFT that is associated with the unique authentication code, and also to identify the current owner of that NFT. If the entity is the current owner of the NFT (345: YES), then at 348 the system may generate and output and authentication message that includes an indication that the image of the substrate is an authenticated copy. Optionally, at 346 the system also may analyze content of the image, and it may compare the image content to content of the NFT that is associated with the unique identification code to determine whether the content of the image matches that of the NFT, If the system cannot verify that the requesting entity is the current owner of the NFT (345: NO) or that the content of the received image matches the content of the NFT that is associated with the code (346: NO), then system will not authenticate the copy, and it will not output the authentication message but instead may output an indication that the copy is not authenticated at 347.

Optionally, the system may only receive the digital image at 341, without receiving a secure credential. At 342 the processor of the device will process the image to extract the unique authentication code from the image using any suitable image processing method. The system would query the blockchain using the unique authentication code to determine whether the code matches an authenticated print that was printed previously. If (and only if) the authentication code extracted from the print matches one stored in the blockchain ledger, the system would provide an authentication message that includes an indication that the image of the substrate is an authenticated copy. If the system cannot verify that the authentication code extracted from the digital image matches information stored in the blockchain ledger, then the system will not output an authentication message.

Figure 4:
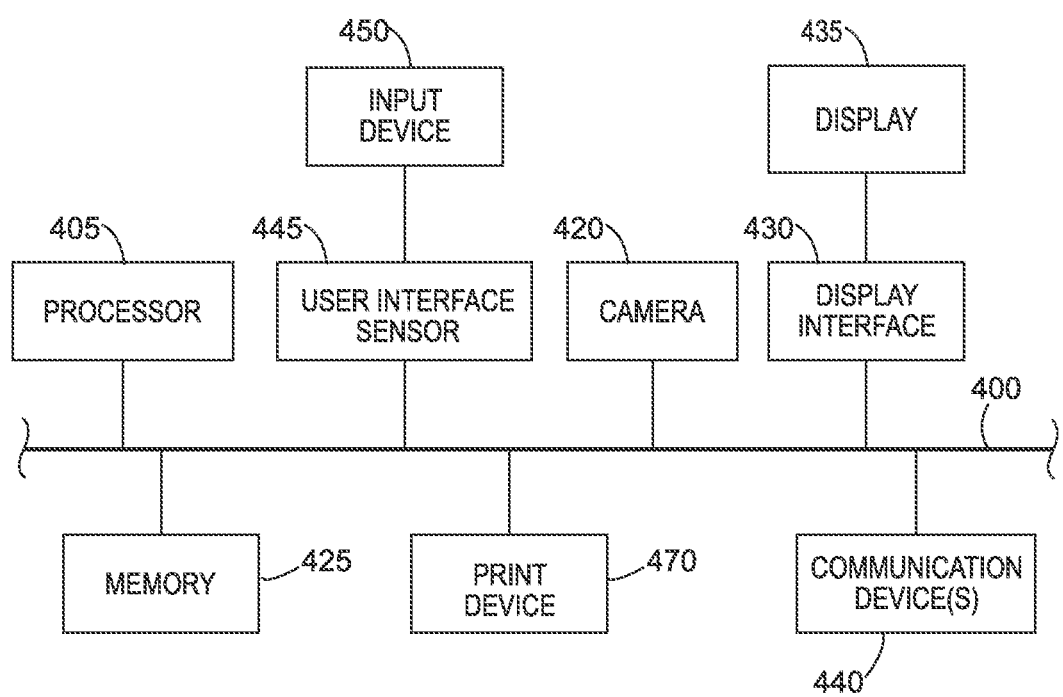
FIG. 4 illustrates example components of computing devices that may implement various embodiments described in this document.

FIG. 4 depicts an example of internal hardware that may be included in any of the electronic components of the system, such as in the print device, in a computing device that a creator uses to create digital content and/or an NFT, or in a computing device that a buyer of an NFT uses to access and print the NFT's associated digital content. One or more conductive busses 400 serve as an information highway interconnecting the other illustrated components of the hardware. Processor 405 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 425. A memory device may include a single device or a collection of devices across which data and/or instructions are stored.

An optional display interface 430 may permit information from the bus 400 to be displayed on a display device 435 in visual, graphic or alphanumeric format. An audio interface and audio output (such as a speaker) also may be provided. Communication with external devices may occur using various communication devices 440 such as a wireless antenna, a radio frequency identification (RFID) tag and/or short-range or near-field communication transceiver, each of which may optionally communicatively connect with other components of the device via one or more communication systems. The communication device 440 may be configured to be communicatively connected to a communications network, such as the Internet, a local area network or a cellular telephone data network.

The hardware may also include a user interface sensor 445 that allows for receipt of data from input devices 450 such as a keyboard, a mouse, a joystick, a touchscreen, a touch pad, a remote control, a pointing device and/or microphone. Digital image frames also may be received from an imaging device 420, such as a camera or scanner, that can capture video and/or still images. The system also may include a print device 470 for printing copies of NFT art or other digital content.

Therefore, in a first aspect, this disclosure describes a method, a system configured to execute the method, and a computer program product configured to cause a processor to implement a method of generating a secure printed copy of content associated with an NFT. The system includes a processor and a computer-readable medium containing programming instructions that are configured to instruct the processor to implement the method. The method includes receiving a print request from a requesting entity, wherein the print request comprises a request to print digital content that is associated with an NFT on a substrate or as a 3D object. The method also includes accessing a distributed digital ledger that is associated with the NFT to identify a current owner of the NFT. The method includes generating a print job that comprises a set of instructions to print the digital content that is associated with the NFT on a substrate. If the current owner of the NFT is the requesting entity, the set of instructions will include directions to print a unique authentication code with the digital content on the substrate or as the 3D object; otherwise, the set of instructions will not include commands to print the unique authentication code on the substrate. The method will then include transferring the print job to a print engine of a print device to print the digital content on the substrate.

Optionally, the method also may include transmitting the unique authentication code and an identifier for the NFT or for the digital content to the distributed digital ledger for storage in a block.

In any of the embodiments above, when transmitting the unique authentication code and the identifier to the distributed digital ledger, the method may be limited to doing so only after the print device has printed the digital content.

In any of the embodiments above, when printing the unique identification code, the system may print a machine identification code that includes a serial number for the print device and a time at which the print device printed the digital content.

In any of the embodiments above, after the digital content is printed, the method also may include: receiving an image of the printed content on the substrate or 3D object, along with a credential associated with an entity who provided the image; process the image to extract the unique authentication code from the image; and accessing the distributed digital ledger to (a) identify the NFT that is associated with the unique authentication code, and (b) identify the current owner of the NFT, The method may then include outputting an indication that the image of the substrate is an authenticated copy only if the current owner of the NFT matches the entity associated with the credential; otherwise the system will not output an indication that the image of the substrate is an authenticated copy.

In any of the embodiments above, after the digital content is printed, the system may: receive an image of the substrate; process the image to extract the unique authentication code and printed content from the image; access the distributed digital ledger to identify the NFT that is associated with the unique authentication code and content of the NFT that is associated with the unique identification code; and compare the content of the digital image to the content of the NFT. The system may then output an indication that the image reflects an authenticated copy only if (a) the authentication code from the image matches an authentication code associated with the NFT in the distributed digital ledger and (b) the printed content matches the content of the NFT that is associated with the unique identification code; otherwise, the system may not output an indication that the image reflects an authenticated copy. Also optionally, in these embodiments, after the digital content is printed, the system may: receive a credential associated with an entity who provided the image; access the distributed digital ledger to identify the current owner of the NFT that is associated with the unique authentication code; and output the indication that the digital image of the substrate is an authenticated copy only if the current owner of the NFT matches the entity associated with the credential, otherwise do not output the indication that the image of the substrate is an authenticated copy.

In any of the embodiments above, the system also may include the print device. The processor and the computer-readable medium may be components of the print device, or of a computing device that is in communication with the print device.

In any of the embodiments above, to generate the print job the system may extract some or all data of the digital content from the NFT and use the extracted data to generate a print system object that represents the digital content and that includes instructions for rendering the digital content on the print device.

In any of the embodiments above, to generate the print job the system may: (a) extract an address for a server from the NFT; (b) query the server for the digital content; and (c) upon receipt of the digital content from the server, generate a print system object that represents the digital content and that includes instructions for rendering the digital content on the print device.

In any of the embodiments above, in response to the NFT containing a rule requiring payment of a royalty or fee for printing an authenticated copy of the digital content, the system may wait to transfer the print job to a print device until the system has received confirmation of payment of the royalty or fee.

In any of the embodiments above, to print the unique authentication code the system may encode a unique combination of characters into a pattern of microdots on the substrate, or into a pantograph mark, a correlation mark, a watermark, a barcode, a QR code, or a matrix code.

Any of the optional features described above for the first aspect also may be included in the second aspect or the third aspect, described below.

In a second aspect, this disclosure describes a method, a system configured to execute the method, and a computer program product configured to cause a processor to implement a method of verifying whether a printed copy of content is an authorized copy. The method includes, by a processor: (a) receiving a digital image of a substrate or 3D object that includes a unique authentication code and other printed content; (b) receiving a credential of an entity who provided the digital image; and (c) processing the digital image to extract the unique authentication code from the digital image. The method also includes accessing a distributed digital ledger to identify a non-fungible token that is associated the NFT that is associated with the unique authentication code, and to identify a current owner of the NFT. The method also includes outputting an indication that the digital image reflects an authenticated copy only if the current owner of the NFT matches the entity associated with the credential; otherwise, the method will not output an indication that the digital image reflects an authenticated copy. Optionally, the digital image may include other printed content; and if so the method may further comprise: (w) processing the digital image to extract the other printed content from the digital image; (x) accessing the distributed digital ledger to identify content of the NFT that is associated with the unique identification code; (y) comparing the content of the digital image to the content of the NFT; and (z) outputting the indication that the image reflects an authenticated copy only if the content of the digital image also matches the content of the NFT; otherwise not outputting an indication that the image reflects an authenticated copy.

Terminology that is relevant to this disclosure includes:

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. Electronic devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices are discussed above in the context of FIG. 4.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, the terms "printer" and "print device" refer to a machine having hardware capable of reading a digital document file and using the information from the file and associated print instructions to print a physical document on a substrate. Components of a print device typically include a print engine, which includes print hardware such as a print head, which may include components such as a print cartridge containing ink, toner or another print material, as well as a document feeding system configured to pass a substrate through the print device so that the print head can print characters and/or images on the substrate. In some embodiments, a print device may have additional capabilities such as scanning or faxing and thus may be a multi-function device. A print device also may include a processor and a memory device containing programming instructions and/or stored data. In embodiments that print a 3D object, the print device may be a 3D printer that can use a digital model to successively place layers of build material on a substrate in a configuration that results in a 3D object.

In this document, the term "match", when referring to a comparison of two items, means that the two items correspond to each other in a discernible way. For example, at least a threshold percentage of the contents of each item may be identical, or in the case of words or labeled images the match may be a semantic similarity.

In this document, the term "print job" refers to any set of instructions that when executed, or a process that when performed, will cause a print device to print digital content from one or more digital content files onto a substrate.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A system for generating a secure printed copy of content associated with a non-fungible token (NFT), the system comprising:
   a processor; and
   a computer-readable medium containing programming instructions that are configured to instruct the processor to:
      receive a print request from a requesting entity, wherein the print request comprises a request to print digital content that is associated with an NFT,
      access a distributed digital ledger that is associated with the NFT to identify a current owner of the NFT,
      generate a print job that comprises a set of instructions to print the digital content that is associated with the NFT, wherein:
         if the current owner of the NFT is the requesting entity, the set of instructions will include instructions to print a unique authentication code with the digital content,
         otherwise the set of instructions will not include instructions to print the unique authentication code, and
      transfer the print job to a print engine of a print device to print the digital content.

2. The system of claim 1, further comprising additional programming instructions that are configured to instruct the processor to, when the current owner of the NFT is the requesting entity:
   transmit the unique authentication code and an identifier for the NFT or for the digital content to the distributed digital ledger for storage in a block.

3. The system of claim 2, wherein the additional programming instructions that are configured to instruct the processor to transmit the unique authentication code and the identifier to the distributed digital ledger also comprise instructions to do so only after the print device has printed the digital content.

4. The system of claim 1, wherein the instructions to print the unique identification code comprise instructions to print a machine identification code that includes a serial number for the print device and a time at which the print device printed the digital content.

5. The system of claim 1, further comprising additional programming instructions that are configured to instruct the processor to, after the digital content is printed:
   receive an image of the printed digital content, along with a credential associated with an entity who provided the image;
   process the image to extract the unique authentication code from the image;
   access the distributed digital ledger to:
      identify the NFT that is associated with the unique authentication code, and
      identify the current owner of the NFT; and
   output an indication that the printed digital content is an authenticated copy only if the current owner of the NFT matches the entity associated with the credential, otherwise do not output an indication that the printed digital content is an authenticated copy.

6. The system of claim 1, further comprising additional programming instructions that are configured to instruct the processor to, after the digital content is printed on the substrate:
   receive an image of the printed digital content;
   process the image to extract the unique authentication code and printed digital content from the image;
   access the distributed digital ledger to identify the NFT that is associated with the unique authentication code and content of the NFT that is associated with the unique identification code;
   compare the content of the image to the content of the NFT; and
   output an indication that the printed digital content is an authenticated copy only if (a) the authentication code from the image matches an authentication code associated with the NFT in the distributed digital ledger and (b) the printed digital content matches the content of the NFT that is associated with the unique identification code, otherwise do not output an indication that the printed digital content is an authenticated copy.

7. The system of claim 6, further comprising additional programming instructions that are configured to instruct the processor to, after the digital content is printed:
   receive a credential associated with an entity who provided the image;
   access the distributed digital ledger to identify the current owner of the NFT that is associated with the unique authentication code; and
   output the indication that the printed digital content is an authenticated copy only if the current owner of the NFT matches the entity associated with the credential, otherwise do not output the indication that the printed digital content is an authenticated copy.

8. The system of claim 1, further comprising:
   the print device, and wherein the processor and the computer-readable medium are components of one or more of the following:
the print device, or
a computing device that is in communication with the print device.

9. The system of claim 1, wherein:
the print device comprises a three-dimensional printer; and
the set of instructions to print the digital content that is associated with the NFT comprise instructions to:
print the digital content as a three-dimensional object, and
if the set of instructions include instructions to print the unique authentication code, print the unique authentication code on a surface of the three-dimensional object or embed the unique authentication code within the three-dimensional object.

10. The system of claim 1, wherein the instructions to generate the print job comprise instructions to extract some or all data of the digital content from the NFT and use the data to generate a queueable print system object that represents the digital content and that includes instructions for rendering the digital content on the print device.

11. The system of claim 1, wherein the instructions to generate the print job comprise instructions to:
extract, from the NFT, an address for a server;
query the server for the digital content; and
upon receipt of the digital content from the server, generate a print system object that represents the digital content and that includes instructions for rendering the digital content on the print device.

12. The system of claim 1, further comprising instructions to, in response to the NFT containing a rule requiring payment of a royalty or fee for printing an authenticated copy of the digital content, waiting to transfer the print job to a print device until the system has received confirmation of payment of the royalty or fee.

13. The system of claim 1, wherein the instructions to print the unique authentication code comprise instructions to encode a unique combination of characters into a pattern of microdots on a substrate.

14. The system of claim 1, wherein the instructions to print the unique authentication code comprise instructions to encode a unique combination of characters into a pantograph mark, a correlation mark, a watermark, a barcode, a QR code, or a matrix code.

15. A print device, comprising:
a processor;
a print engine; and
a computer-readable medium containing programming instructions that are configured to instruct the processor to:
receive a print request from a requesting entity, wherein the print request comprises a request to print digital content that is associated with an NFT,
access a distributed digital ledger that is associated with the NFT to identify a current owner of the NFT,
in response to determining that the current owner of the NFT is the requesting entity, generate a print job that comprises a set of instructions to cause the print engine to print the digital content that is associated with the NFT along with a unique authentication code, and
use the print engine to print the digital content with the unique identification code.

16. The print device of claim 15, further comprising additional programming instructions that are configured to instruct the processor to, in response to determining that the current owner of the NFT is the requesting entity:
transmit the unique authentication code and an identifier for the NFT or for the digital content to the distributed digital ledger for storage in a block.

17. The print device of claim 16, wherein the additional programming instructions that are configured to instruct the processor to transmit the unique authentication code and the identifier to the distributed digital ledger also comprise instructions to do so only after the print device has printed the digital content.

18. The print device of claim 15, wherein the instructions to print the unique identification code comprise instructions to print a machine identification code that includes a serial number for the print device and a time at which the print device printed the digital content.

19. The print device of claim 15, wherein the instructions to generate the print job comprise instructions to extract the digital content from the NFT and use the data to generate a print system object that represents the digital content and that includes instructions for rendering the digital content on the print device.

20. The print device of claim 15, wherein the instructions to generate the print job comprise instructions to:
extract, from the NFT, an address for a server;
query the server for the digital content; and
upon receipt of the digital content from the server, generate a print system object that represents the digital content and that includes instructions for rendering the digital content on the print device.

21. The print device of claim 15, further comprising instructions to, in response to the NFT containing a rule requiring payment of a royalty or fee for printing an authenticated copy of the digital content, waiting to use the print engine to print the digital content with the unique identification code until the print device has received confirmation of payment of the royalty or fee.

22. The print device of claim 15, wherein the instructions to print the unique authentication code comprise instructions to encode a unique combination of characters into a pattern of microdots, a pantograph mark, a correlation mark, a watermark, a barcode, a QR code, or a matrix code.

23. The print device of claim 15, wherein:
the print device comprises a three-dimensional printer; and
the set of instructions to print the digital content that is associated with the NFT comprise instructions to:
print the digital content as a three-dimensional object, and
print the unique authentication code on a surface of the three-dimensional object or embed the unique authentication code within the three-dimensional object.

24. A method of generating a secure printed copy of content associated with a non-fungible token (NFT), the method comprising, by a processor:
receiving a print request from a requesting entity, wherein the print request comprises a request to print digital content that is associated with an NFT;
accessing a distributed digital ledger that is associated with the NFT to identify a current owner of the NFT;
generating a print job that comprises a set of instructions to print the digital content that is associated with the NFT, wherein:
if the current owner of the NFT is the requesting entity, the instructions will include directions to print a unique authentication code with the digital content, otherwise the instructions will not include commands to print the unique authentication code, and transferring the print job to a print engine to print the digital content.

25. A computer program product for generating a secure printed copy of content associated with a non-fungible token (NFT), the computer program product comprising a non-transitory memory and programming instructions that are configured to cause a processor to:

receive a print request from a requesting entity, wherein the print request comprises a request to print digital content that is associated with an NFT;

access a distributed digital ledger that is associated with the NFT to identify a current owner of the NFT;

generate a print job that comprises a set of instructions to print the digital content that is associated with the NFT, wherein:

if the current owner of the NFT is the requesting entity, the set of instructions will include directions to print a unique authentication code with the digital content, otherwise the set of instructions will not include commands to print the unique authentication code, and transfer the print job to a print engine to print the digital content.

\* \* \* \* \*